United States Patent
Wells et al.

(10) Patent No.: US 10,996,481 B1
(45) Date of Patent: May 4, 2021

(54) HEAD-UP DISPLAY CALIBRATION

(71) Applicant: GM GLOBAL TECHNOLOGY OPERATIONS LLC, Detroit, MI (US)

(72) Inventors: James W. Wells, Rochester Hills, MI (US); Jinglin Li, Troy, MI (US); Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 16/688,139

(22) Filed: Nov. 19, 2019

(51) Int. Cl.
*G02B 27/01* (2006.01)
*B32B 17/10* (2006.01)

(52) U.S. Cl.
CPC .... *G02B 27/0179* (2013.01); *B32B 17/10036* (2013.01)

(58) Field of Classification Search
CPC ............. G02B 27/01; G02B 27/0101; G02B 27/0103; G02B 27/0179; G02B 2027/0105; G02B 2027/0107; G02B 2027/0109; G02B 2027/011; G02B 2027/0112; G02B 2027/0114; G02B 2027/0116; G02B 2027/01189; G02B 2027/012; G02B 2027/0121; G02B 2027/0123; G02B 2027/0125; G02B 2027/0127; G02B 2027/0129; G02B 2027/0138; G02B 2027/014; G02B 2027/0141; G02B 2027/0145; G02B 2027/0147; G02B 2027/0181; G02B 2027/0183; G02B 2027/0185; G02B 2027/0187; G02B 2027/0192; G02B 2027/0194; G02B 2027/0196; G02B 2027/0198
See application file for complete search history.

(56) References Cited

U.S. PATENT DOCUMENTS

| | | | | |
|---|---|---|---|---|
| 5,864,432 A * | 1/1999 | Deter | ................. | G02B 27/0101 359/634 |
| 2008/0089611 A1* | 4/2008 | McFadyen | .............. | G06T 5/006 382/289 |
| 2013/0163088 A1* | 6/2013 | Kuhlman | ............. | G02B 26/005 359/630 |
| 2015/0146990 A1* | 5/2015 | Uchiyama | ............... | G06T 5/006 382/201 |
| 2015/0168719 A1* | 6/2015 | Kim | ...................... | G02B 27/01 345/7 |
| 2016/0041386 A1* | 2/2016 | Rodriguez Moreno | ..................... | G06F 9/451 345/7 |
| 2017/0195647 A1* | 7/2017 | Honkanen | .............. | H04N 9/315 |
| 2018/0075675 A1* | 3/2018 | Kim | ....................... | G01S 13/931 |
| 2019/0285882 A1* | 9/2019 | Arndt | ..................... | B60K 35/00 |

* cited by examiner

*Primary Examiner* — Dong Hui Liang
(74) *Attorney, Agent, or Firm* — Cantor Colburn LLP

(57) ABSTRACT

A HUD apparatus for a vehicle includes a HUD patch defined upon a reflective surface of a windshield of the vehicle. A virtual image generator projects a virtual image within the HUD patch. An image sensor is coaligned with the virtual image generator and has a field of view including the HUD patch. A controller is configured to receive, from the image sensor, a HUD patch image, and to adjust the projected virtual image based upon the HUD patch image.

18 Claims, 4 Drawing Sheets

HEAD-UP DISPLAY CALIBRATION

INTRODUCTION

This disclosure is related to head-up displays (HUD).

A HUD is a display that presents data in a partially transparent manner and at a position allowing a user to see it without having to look away from his/her usual viewpoint (e.g., substantially forward). Although developed for military use, HUDs are now used in commercial aircraft, automobiles, computer gaming, and other applications.

Within vehicles, HUDs may be used to project virtual images or vehicle parameter data in front of the vehicle windshield or surface so that the image is in or immediately adjacent to the operator's line of sight. Vehicle HUD systems can project data based on information received from operating components (e.g., sensors) internal to the vehicle to, for example, notify users of lane markings, identify proximity of another vehicle, or provide nearby landmark information.

HUDs may also receive and project information from information systems external to the vehicle, such as a navigational system on a smartphone. Navigational information presented by the HUD may include, for example, projecting distance to a next turn and current speed of the vehicle as compared to a speed limit, including an alert if the speed limit is exceeded. External system information advising what lane to be in for an upcoming maneuver or warning the user of potential traffic delays can also be presented on the HUD.

HUDs may also be employed in augmented reality displays or enhanced vision systems that identify, index, overlay or otherwise reference objects and road features including infrastructure. Such advanced systems require precision alignment of HUD images relative to the observers within the vehicle and objects within their field of view. Moreover, such HUD systems may employ the windshield to provide HUD combiner functionality over a wide field of view. Such large format reflective displays present challenges to the designer with respect to image location and distortion.

SUMMARY

In one exemplary embodiment, a HUD apparatus for a vehicle may include a HUD patch defined upon a reflective surface of a windshield of the vehicle, a virtual image generator for projecting a virtual image within the HUD patch, an image sensor coaligned with the virtual image generator and having a field of view including the HUD patch, and a controller configured to receive, from the image sensor, a HUD patch image, and adjust the projected virtual image based upon the HUD patch image.

In addition to one or more of the features described herein, a film may be disposed on the reflective surface of the windshield within the HUD patch including one or more identification features discernable from the HUD patch image. The one or more identification features provides information corresponding to distortion effects of the reflective surface within the HUD patch to the controller. Adjusting the projected virtual image based upon the HUD patch image includes adjusting the projected virtual image to counteract the distortion effects of the reflective surface.

In addition to one or more of the features described herein, a film may be disposed on the reflective surface of the windshield within the HUD patch including one or more identification features discernable from the HUD patch image. The one or more identification features provide information corresponding to a desired center for the projected virtual image within the HUD patch to the controller. Adjusting the projected virtual image based upon the HUD patch image includes centering the projected virtual image based upon the desired center.

In addition to one or more of the features described herein, an IR light beam illuminates the film, and the film may include polarization dependent reflectance.

In addition to one or more of the features described herein, an IR light beam illuminates the film, and the film may include fluorescence.

In addition to one or more of the features described herein, a film may be disposed on the reflective surface of the windshield within the HUD patch including one or more identification features discernable from the HUD patch image. The one or more identification features provide information corresponding to distortion effects of the reflective surface within the HUD patch to the controller. A calibration array is positioned within a HUD eyebox of the vehicle, whereby the HUD patch image includes the calibration array reflected off the reflective surface of the windshield. Adjusting the projected virtual image based upon the HUD patch image includes adjusting the projected virtual image to counteract the distortion effects of the reflective surface. Adjusting the projected virtual image based upon the HUD patch image includes centering the projected virtual image based upon the calibration array.

In addition to one or more of the features described herein, an IR light beam directly illuminates the film and illuminates the calibration array by reflectance off the reflective surface of the windshield. The film may include polarization dependent reflectance and the calibration array includes reflectors.

In addition to one or more of the features described herein, a calibration array may be positioned within a HUD eyebox of the vehicle, whereby the HUD patch image includes the calibration array reflected off the reflective surface of the windshield. The HUD patch image provides information corresponding to distortion effects of the reflective surface within the HUD patch to the controller. Adjusting the projected virtual image based upon the HUD patch image includes adjusting the projected virtual image to counteract the distortion effects of the reflective surface.

In addition to one or more of the features described herein, adjusting the projected virtual image based upon the HUD patch image may include centering the projected virtual image based upon the calibration array.

In addition to one or more of the features described herein, the calibration array may include reflective identification features.

In addition to one or more of the features described herein, the calibration array may include active radiating identification features.

In another exemplary embodiment, a HUD apparatus for a vehicle may include a HUD patch defined upon a reflective surface of a windshield of the vehicle, an IR projector providing an IR light beam illuminating the HUD patch, a virtual image generator for projecting a virtual image within the HUD patch, an image sensor coaligned with the virtual image generator, having a field of view including the HUD patch, and providing a HUD patch image. The HUD apparatus further includes a film disposed on the reflective surface of the windshield within the HUD patch including geometric features discernable from the HUD patch image when illuminated by the IR light beam. The geometric features provide information corresponding to distortion effects of the reflective surface within the HUD patch. The HUD apparatus also includes a controller configured to receive, from the image sensor, the HUD patch image, and adjust the projected virtual image based upon the HUD patch image.

In addition to one or more of the features described herein, adjusting the projected virtual image based upon the HUD patch image may include adjusting the projected virtual image to counteract the distortion effects of the reflective surface.

In addition to one or more of the features described herein, adjusting the projected virtual image based upon the HUD patch image may include centering the projected virtual image based upon a desired center.

In addition to one or more of the features described herein, the film may include polarization dependent reflectance.

In addition to one or more of the features described herein, the film may include fluorescence.

In addition to one or more of the features described herein, a calibration array may be positioned within a HUD eyebox of the vehicle, whereby the HUD patch image includes the calibration array reflected off the reflective surface of the windshield. The HUD patch image provides information corresponding to a desired center for the projected virtual image within the HUD patch to the controller. Adjusting the projected virtual image based upon the HUD patch image includes centering the projected virtual image based upon the HUD patch image.

In yet another exemplary embodiment, a method for operating a HUD apparatus for a vehicle may include providing a reflective surface on a windshield of the vehicle within a HUD patch, providing a virtual image generator for projecting a virtual image within the HUD patch, coaligning an image sensor with the virtual image generator, receiving, from the image sensor, a HUD patch image, and adjusting the projected virtual image based upon the HUD patch image.

In addition to one or more of the features described herein, the method may include providing a film disposed on the reflective surface of the windshield, the film including one or more identification features discernable from the HUD patch image, the one or more identification features providing information corresponding to distortion effects of the reflective surface within the HUD patch. Adjusting the projected virtual image based upon the HUD patch image includes adjusting the projected virtual image to counteract the distortion effects of the reflective surface.

In addition to one or more of the features described herein, the method may include providing a calibration array positioned within a HUD eyebox of the vehicle, the HUD patch image including the calibration array reflected off the reflective surface of the windshield, the HUD patch image providing information corresponding to distortion effects of the reflective surface within the HUD patch. Adjusting the projected virtual image based upon the HUD patch image includes adjusting the projected virtual image to counteract the distortion effects of the reflective surface.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
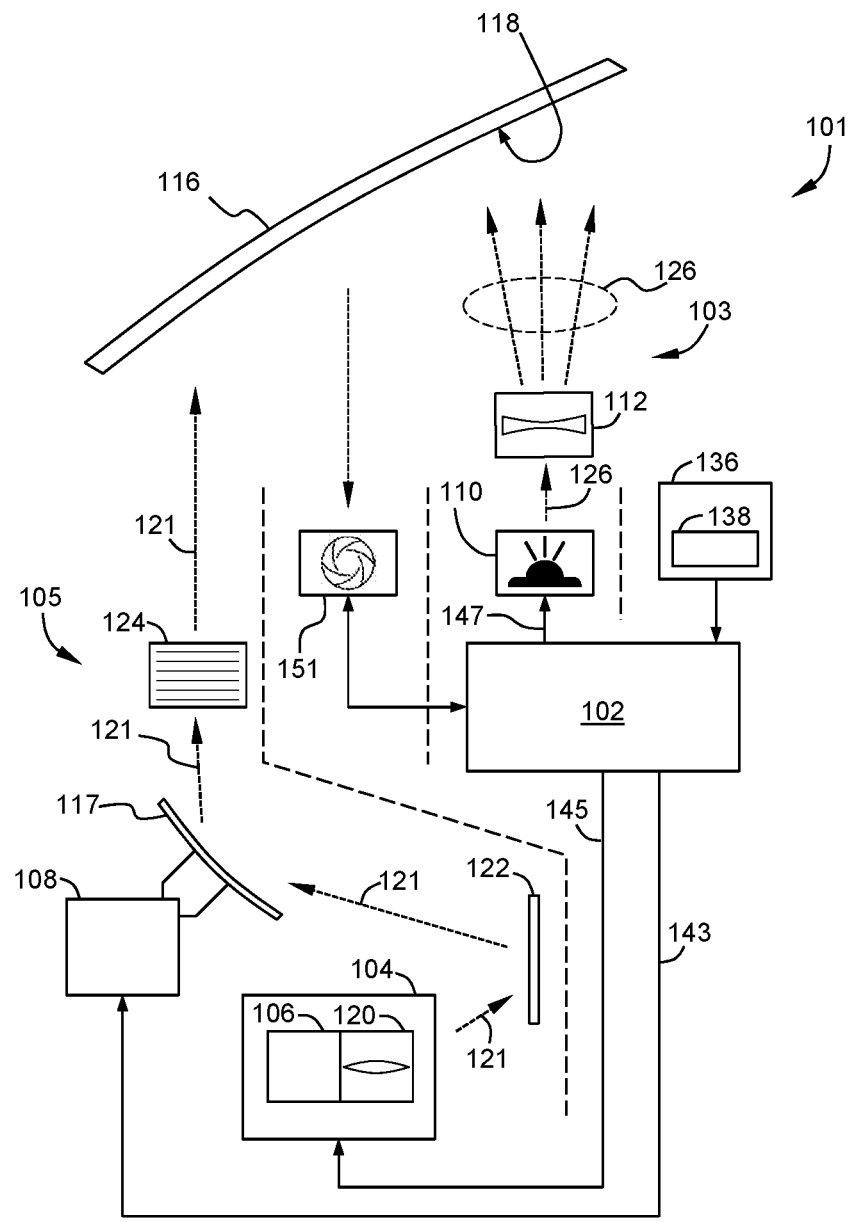
FIG. 1 illustrates a HUD system in accordance with the present disclosure.

The following description is merely exemplary in nature and is not intended to limit the present disclosure, its application or uses. Throughout the drawings, corresponding reference numerals indicate like or corresponding parts and features. As used herein, control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle networks (e.g. Controller Area Network (CAN), Local Interconnect Network (LIN) and in-plant and service-related networks). Control module functions as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

FIG. 1 schematically illustrates an exemplary HUD system 101 in accordance with the present disclosure. The HUD system 101 includes a reflective display which is preferably windshield 116 providing a reflective surface 118 such as an inner layer of glass of a laminated windshield. The windshield 116 includes a HUD patch which generally refers to a region of the windshield 116 wherein HUD virtual images may be displayed. The HUD system 101 may include a control module 102, a virtual image generator 105 including a picture generation unit (PGU) 104 with image light source 106 and display and lens assembly 120, one or more fold mirrors 122, adjustable mirror 117 and associated mirror actuator 108, and light and glare traps 124. HUD system 101 may further include an illumination projector 103 including an illumination light source 110 and illumination optic assembly 112. Preferably, the illumination light source 110 operates outside of the visible spectrum. More preferably, the illumination light source 110 operates in the infrared (IR) spectrum, including the near IR spectrum. Other illumination light sources 110 may be employed in accordance with other aspects of present disclosure. HUD system 101 may further include image sensor 151, for example a CCD or CMOS camera, preferably coaligned with virtual image generator 105. Image sensor 151 preferably has a field of view that includes a portion of the HUD patch. The portion of the HUD patch included within the field of view of the image sensor preferably includes the entire HUD patch. An image corresponding to the HUD patch (HUD patch image) is understood to mean an image appearing within the HUD patch. Image sensor 151 may be used in the HUD system 101 as a user location sensor relying upon images of the current vehicle operator, preferably the eye locations, while in the driver seat of the vehicle. Such images of the current vehicle operator are images that are reflected off the reflective surface 118 of windshield 116. The control module 102 controls operation of the PGU 104 including image light source 106 via control line 145 to generate a virtual image. The control module 102 also controls operation of the illumination light source 110 via control line 147 to project illumination light toward windshield 116. The control module 102 also controls operation of the image sensor 151 for capturing reflected or fluoresced images at windshield 116 in accordance with the present disclosure. The control module 102 controls operation of the mirror actuator 108 via control line 143 to rotate or tilt a mirror 117 and adjust where on windshield the HUD virtual image is projected. The mirror actuator may include a motor, gears, shafts, and/or other components to change the position and/or orientation of the mirror 117. The mirror 117 may magnify the image generated by the PGU 104 and/or correct certain distortions associated with the windshield 116.

In one embodiment, the HUD system 101 includes the virtual image generator 105 including PGU 104, the mirror actuator 108, the mirror 117 and one or more fold mirrors 122. In another embodiment, the HUD system 101 also includes the image sensor 151. In yet another embodiment, the HUD system 101 also includes the illumination projector 103 including illumination light source 110 and illumination optic assembly 112. In one embodiment, the virtual image generator 105 and image sensor 151 are implemented in a housing separate from the illumination projector 103. In another, preferred, embodiment, virtual image generator 105, image sensor 151 and illumination projector 103 are implemented in a single housing.

The PGU 104 may include the image light source 106 and a display and lens assembly 120. The image light source 106 generates a virtual image light beam 121 including graphic images that are projected onto a display of the display and lens assembly 120. The virtual image light beam 121 is then directed at a series of one or more fold mirrors 122. The one or more fold mirrors 122 may be used for packaging considerations. The virtual image light beam 121 is reflected at the mirror 117 and then may be reflected through light and glare traps 124 to the windshield 116. The virtual image light beam 121 is displayed on the windshield which serves as the HUD combiner. The light and glare traps 124 may filter and thus prevent, for example, sun light (or ambient light) from being reflected from the windshield 116 towards the mirror 117 and minimize effects of glare.

The illumination light source 110, may include a laser, one or more light emitting diodes (LEDs), or other suitable illumination source. The illumination light source 110 generates illumination light beam 126, which is directed through illumination optic assembly 112 and dispersed upon the windshield 116.

The HUD system 101 may further include and/or be connected to a manual controller 136 including switches (buttons, paddles, sliders, rotaries, joysticks or the like) 138. The HUD system 101 may also include and/or be connected to a display, seat motors, or seat switches (not separately illustrated). The display may be, for example, a touchscreen, an infotainment display located in a center console of a vehicle, or other display. The seat motors are used to position one or more seats. The control module 102 may control operations of the seat motors based on user inputs via the seat switches and/or seat settings stored in memory. The manual controller 136 may be used by a user to manually adjust the height of virtual images provided by the PGU 104 via the switches 138. Alternatively, a display touchscreen may provide a user interface (UI) for manual adjustments of the HUD virtual image during end user application such as by a vehicle occupant. Such a display, seat switches and switches 138 may be referred to as input devices and/or interfaces or more generally as a user interface. In limited circumstances in accordance with the present disclosure, the input devices may provide a user interface to establish operator intent or control of an automated or partially automated alignment procedure for the HUD virtual image.

The virtual image light beam 121 may follow a main ray path of a HUD virtual image from a center of a HUD display, which is part of the display and lens assembly 120 to the windshield 116. The main ray path is referred to as a gut ray. The illumination light beam 126 may follow a different path than the virtual image light beam 121. The path of the illumination light beam 126 may or may not be parallel to a portion of or the entire path of the virtual image light beam 121. The light beams 121, 126 do not need to follow the same optical path. Moreover, whereas virtual image light beam 121 may be collimated, illumination light beam 126 need not be collimated and may preferably be dispersed or scattered to achieve illumination of substantial regions of interest on the windshield in accordance with the present disclosure. The regions of interest on the windshield generally coincide with the HUD patch.

Certain HUD applications require precise alignment of the virtual images produced by the HUD. Placement of simple information presentation on the windshield, such as conventional engine gauge display, is not positionally critical. However, augmented reality systems intended to improve driver or occupant situational awareness by identifying, overlaying, or otherwise enhancing visibility of objects or features located on a road scene require virtual image placement taking into consideration the observer's eye position, the scene object position and the vehicle windshield position. In order to enable robust virtual image placement fidelity in such systems, the virtual image position must be calibrated relative to the vehicle reference frame. In addition to positional precision, geometric accuracy and undistorted images as perceived by the operator are desirable.

Figure 2:
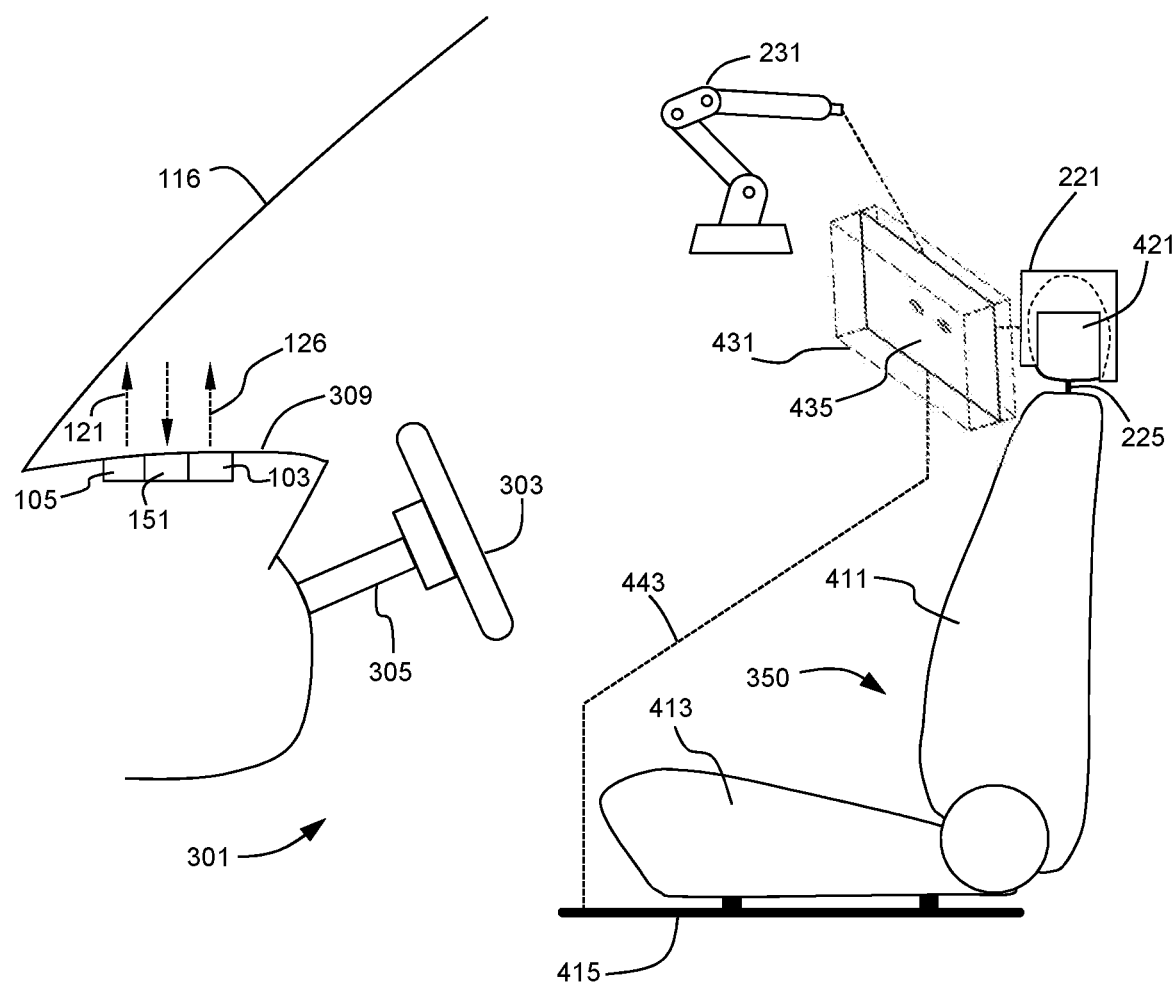
FIG. 2 illustrates a side view of a vehicle interior in accordance with the present disclosure.
Figure 3:
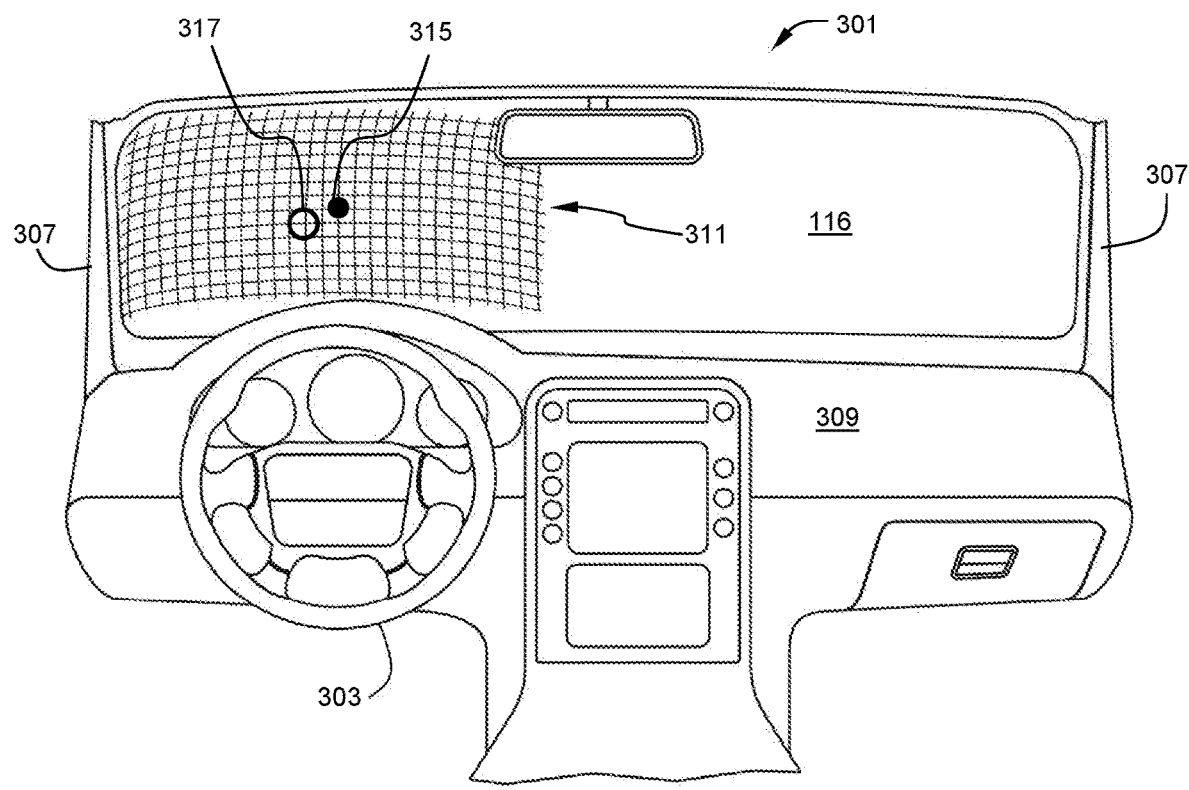
FIG. 3 illustrates a forward looking view of a vehicle interior in accordance with the present disclosure.

In accordance with an exemplary embodiment, FIGS. 2 and 3 are illustrative views showing an example of a portion of the interior of a vehicle incorporating a HUD system in accordance with the present disclosure. FIG. 2 is a side-view representation of the front driver position, whereas FIG. 3 illustrates a forward-looking view of a portion of the interior of a passenger vehicle 301 substantially along a longitudinal centerline. Dashboard assembly 309 extends laterally within the vehicle cabin substantially forward of the doors and beneath and between the A-pillars 307. A-pillars 307 frame the windshield 116. Steering wheel 303 is located forward of the driver seat 350 and is coupled to a steering column assembly 305.

Assembly of HUD system 101 into the vehicle may be accomplished by the installation of an entire dash assembly into which the HUD system 101 has been assembled as part of a subassembly process or build-up of the dash assembly 309. Alternatively, a smaller subassembly including an instrument cluster pod may contain the HUD system 101 and may be assembled to the dash assembly already installed within the vehicle. Alternatively, the HUD system 101 may be assembled into the instrument cluster, dash assembly or upper dash pad as a separate assembly component. HUD system 101 is illustrated including virtual image generator 105, image sensor 151 and illumination projector 103. Virtual image generator 105 is adapted and controlled to project virtual image light beam 121 toward windshield 116 within the HUD patch. Illumination projector 103 is adapted and controlled to illuminate, with illumination light beam 126, at least the HUD patch of windshield 116. The image sensor 151 is adapted and controlled to capture and resolve HUD patch images. HUD patch images may include reflected and fluoresced light.

In accordance with one embodiment, the windshield 116 may have disposed thereon a selectively reflective film 311 covering a portion of the HUD patch. The portion of the HUD patch covered by the film 311 is preferably the entire HUD patch. Film 311 may have polarization dependent reflectance and/or fluorescence characteristics defining one or more identification features, such as a known grid or other quantified geometric pattern including concentric circles and radii, dot patterns and the like. Film 311 may be selectively reflective of light, preferably light outside the visible spectrum, and more particularly IR light. Additionally, or alternatively, the film may fluoresce when excited by light, preferably light outside the visible spectrum, and more particularly IR light. Thus, in the presence of the illumination light beam 126, the identification features of film 311 may reflect or fluoresce. In the present embodiment, the film reflection and/or fluorescence provides the HUD patch image. The pattern is discernable by image sensor 151 which captures the HUD patch image. Image sensor 151 preferably has a field of view that includes a portion of the film 311. The portion of the film 311 included within the field of view of the image sensor 151 is preferably a portion of the one or more identification features. The portion of the one or more identification features included within the field of view of the image sensor 151 is preferably the entirety of the one or more identification features. The portion of the film 311 included within the field of view of the image sensor 151 is preferably the entire film 311. As used herein, the term film is understood to include a thin film coating for establishing identification features on or within the windshield. Such coatings may be applied, for example, by any suitable process including, for example, physical vapor deposition (PVD), ion-assisted deposition (IAD), and ion beam sputtering (IBS). Other processes and materials for establishing identification features may include, for example, etching, micro-stenciling, screen printing, curable inks and coatings, etc. Preferably, the field of view of the image sensor includes the entirety of the one or more identification features and more preferably the entirety of the HUD patch. While illumination projector 103 is illustrated and described as preferably packaged as part of the HUD system 101, alternative embodiments may locate the illumination projector 103 or alternative illuminator external to the HUD system 101. Additionally, it is to be appreciated that such illumination may be provided from an external source temporarily associated with the vehicle, but otherwise not incorporated within the vehicle as a permanent piece of equipment.

In accordance with the present disclosure, the image sensor 151 together with the illuminated film 311 may be useful in aligning images displayed upon the windshield 116 by virtual image generator 105 and useful to instrument the reflective display geometry at the HUD patch of windshield 116. Known features or fiducials within the pattern of film 311 allows for aligning the center of the virtual image generator 105 with a preferred point on the windshield 116. In one embodiment, the center of the virtual image generator 105 preferably aligns with the center of the HUD patch. Such adjustments may be made manually or autonomously. For example, the operator may adjust through manual controller 136 (FIG. 1) a centering image 317 generated by the PGU 104 to a known center feature or fiducial 315 within the pattern of film 311. Alternatively, such adjustment may be effected through image sensor 151 feedback of alignment of the centering image 317 generated by the PGU 104 the known center feature or fiducial 315 within the pattern of film 311. Adjustments of the virtual image may be implemented in various ways depending upon the particular hardware configuration of the HUD system 101 and, more particularly, of the virtual image generator 105. By way of non-limiting examples, adjustment of the virtual image may be effected by rotation of an interior mirror in the case of a DLP HUD system, application of a lens function to a phase hologram in the case of a holographic HUD system, or image translation on an LCD display having reserve pixels, or x,y translation of the entire LCD display in a LCD HUD system. Optical effects within a HUD patch observed by the image sensor correspond closely to the optical effects imparted by the reflective surface 118 of the windshield 116 within the HUD patch upon the virtual images projected by the virtual image generator 105. Thus, the curvature, waves, dimples and other imperfections in the windshield may become apparent to the observer of reflected images, such as the reflected virtual images of the HUD. With respect to such distortion effects imparted by the reflective surface of the windshield, adjustments to the projected virtual image may be made to counteract such effects. Adjustment may be made by well-known image distortion or warping engines implemented within the PGU, controller 102 or other off-vehicle processor. Preferably, such corrections are implemented in non-volatile memory associated with the PGU 104 as a calibration thereto and applied to raw images provided by controller 102 for projection and display. Alternatively, such corrections may be implemented in non-volatile memory associated with the controller 102 as a calibration thereto which applies corrections to raw images prior to provision to the PGU 104 for projection and display. In an alternative embodiment, image sensor 151 may be provided from an external source temporarily associated with the vehicle, but otherwise not incorporated within the vehicle as a permanent piece of equipment. Preferably, however, image sensor 151 is coaligned with virtual image generator 105 such that the optical effects within the HUD patch observed by the image sensor correspond closely to the optical effects imparted by the windshield within the HUD patch upon the virtual images projected by the virtual image generator 105. It is envisioned that such alignment and distortion corrections are infrequently required, for example during initial vehicle assembly, windshield replacement, or HUD system 101 removal and replacement.

Figure 4:
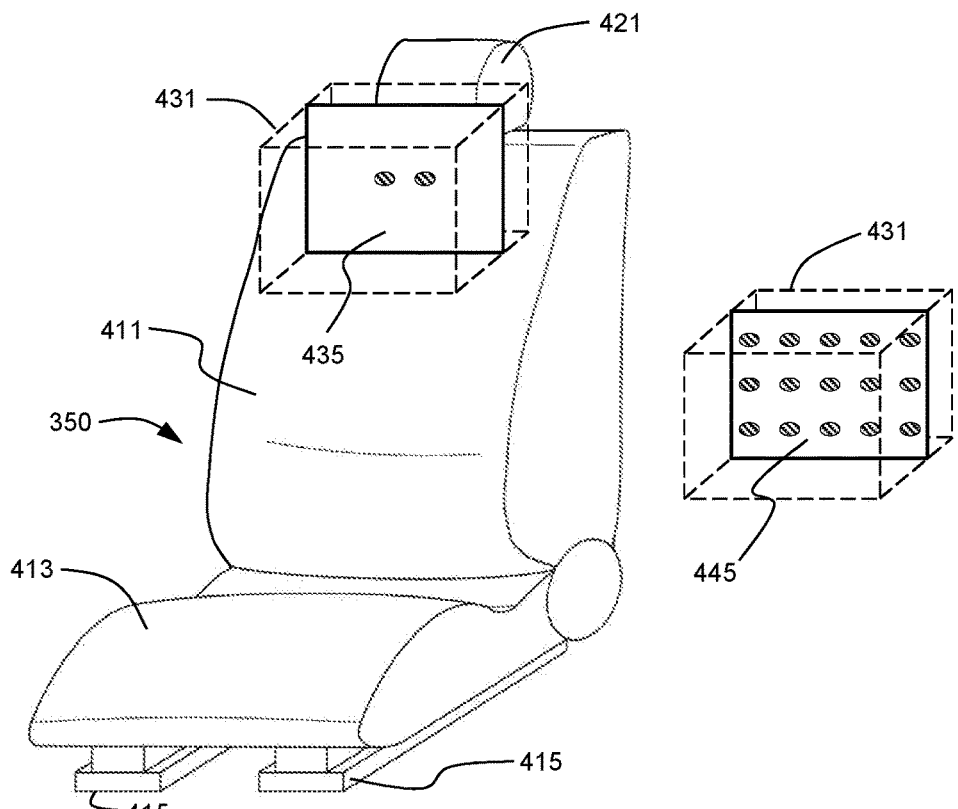
FIG. 4 illustrates exemplary calibration arrays and eyebox location within a vehicle interior in accordance with the present disclosure.

With reference now to FIG. 4 and again to FIG. 2, additional embodiments in accordance with the present disclosure include reference to a HUD eyebox 431. In the figures, driver seat 350 is illustrated and includes adjustable seat bottom 413, adjustable seat back 411, and adjustable headrest 421. The seat is movably fastened to seat rails 415 and, within limits, may be able to raise, lower, tilt, and move fore/aft. The seatback 411 is hinged toward its bottom at the rear of the seat bottom 413. Headrest 421 is secured to the seatback 411 via posts 225 disposed within post guides at the top of seatback 411. Headrest 421 is adjustable up and down and may articulate or rotate, also within limits. Seat adjustments may be made manually, through power operation, or a combination of both. The vehicle operator may establish a seating position and hence the operator's eye position. Eyebox 431 is located generally in front of the seat back 411 at the general height of the headrest 421.

Exemplary calibration arrays 435, 445 may include identification features for positioning within an eyebox 431. For example, each of the calibration arrays 435, 445 illustrated within eyebox 431 in FIG. 4 may be arranged to provide the respective identification features within the HUD patch on windshield 116 as further described below. The identification features are preferably reflective, and more preferably are retroreflective known to reflect incident light back to the source with minimal scattering. Calibration array 435 may include a pair of reflective identification features generally representative in position to a pair of operator's eyes. Calibration array 445 may include an ordered matrix of reflective identification features distributed over a majority of the forward facing 2-dimensional space of the eyebox 431. More expansive arrays of identification features may be used which may extend well beyond the traditional limits of an eyebox, and instead are dimensioned closer to the actual size of the HUD patch. As used herein, a calibration array is considered within the eyebox when at least a portion of the calibration array is within the eyebox. Alternative arrangements and patterns are envisioned for calibration arrays and within the scope of the present disclosure. For example, a calibration array may include a plurality of rows and columns of reflective features such as dots or lines forming a matrix or grid having a regular and known geometric pattern. Preferably, the calibration arrays selectively reflect the wavelengths from the illumination projector 103. As an alternative to reflective identification features, the identification features may include active radiating identification features such as liquid crystal displays (LCD) or light-emitting diodes (LED). Preferably, such active radiating identification features operate outside of the visible spectrum. More preferably, the active radiating identification features operate in the IR spectrum. Other active radiating identification features may be employed in accordance with other aspects of present disclosure. Each of the calibration arrays may be located within the reflected field of view of image sensor 151, whereby light reflected or emitted from the calibration arrays reaches the image sensor 151 through reflection at the windshield 116. Thus, in the present embodiment, the reflection off the windshield 116 of the calibration array provides the HUD patch image. The pattern is discernable by image sensor 151 which captures the HUD patch image.

System set-up and calibration (e.g. alignment and distortion correction) may be effected, as mentioned, during initial vehicle assembly, windshield replacement, or HUD system 101 removal and replacement, for example. Thus, it is desirable for repeatability of results to ensure consistent set up. In accordance with the present disclosure's use of calibration arrays 435, 445 within an eyebox 431, an eyebox location is defined substantially in accordance with a vehicle references in mind. For example, features within the vehicle providing reference for an eyebox location may include, for example, one or more of A-pillars, B-pillars, door opening frame, roof or other structural features. One exemplary feature may include the vehicle seat tracks 415. FIG. 2 schematically illustrates a fixture 443 referenced to the vehicle seat tracks 415 and carrying the exemplary calibration array 435. Alternatively, a headrest fixture 221 may be attached to headrest 421 or secured to the seatback 411 in place of the headrest via posts disposed within headrest post guides at the top of seatback 411. The headrest fixture may then carry the exemplary calibration array 435. In such embodiment, the seat may be established into limit positions to reduce the variability of the fixture and reflector array position relative to the vehicle reference frame. Additionally, seat positioning motors may be utilized to establish the limit positions and/or to move the fixture into a final desired position. Such adaptable configurations may further be combined with an alignment system (not shown) to locate the fixture in space with respect to the vehicle reference frame. An alignment system may include one or more image cameras in a known vision system or a known laser alignment system coupled to the fixture or calibration array and indexed to the vehicle reference frame, for example. In another embodiment for locating calibration array 435 within an eyebox, industrial robotics 231 may be employed with or without an alignment system as set forth above.

Figure 5:
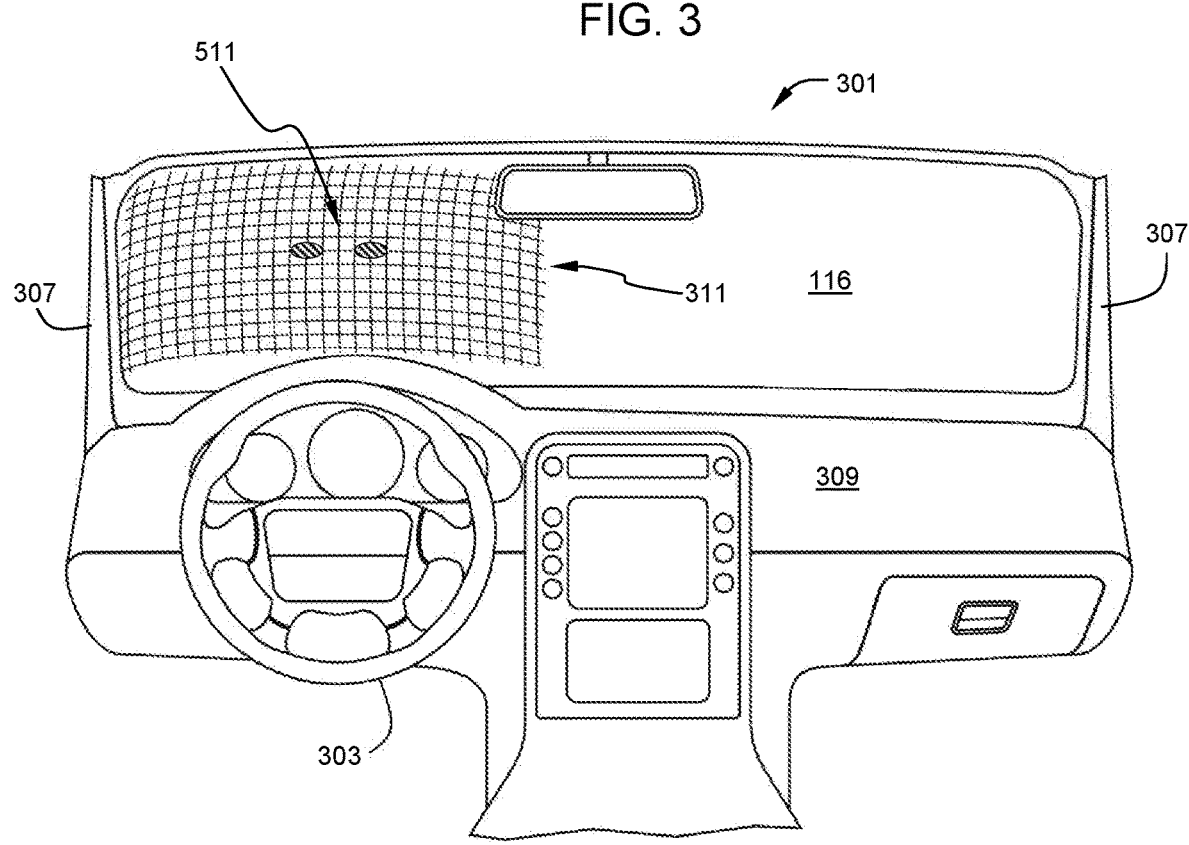
FIG. 5 illustrates a forward looking view of a vehicle interior in accordance with the present disclosure.

With additional reference now to FIG. 5, windshield 116 is shown with film 311 covering at least a portion of the HUD patch. Film 311 may have polarization dependent reflectance and fluorescence characteristics defining one or more identification features such as a grid as shown and as previously described in detail herein. Exemplary calibration array 435 including the pair of reflective identification features is illuminated by the illumination light beam 126 reflected off the windshield 116. The image sensor 151 observes the calibration array image 511 reflected off the windshield 116 within the HUD patch and relative to the grid of the film 311. With this information, the reflector array 435 may be utilized to determine the center of the user viewing axis corresponding to the calibration array 435 location. The presence of the grid from the film 311 covering the larger area of the HUD patch allows for distortion correction as described herein. Thus, in the present embodiment, the HUD patch image includes the reflection off the windshield 116 of the calibration array and the film reflection and/or fluorescence. The patterns are discernable by image sensor 151 which captures the HUD patch image.

Figure 6:
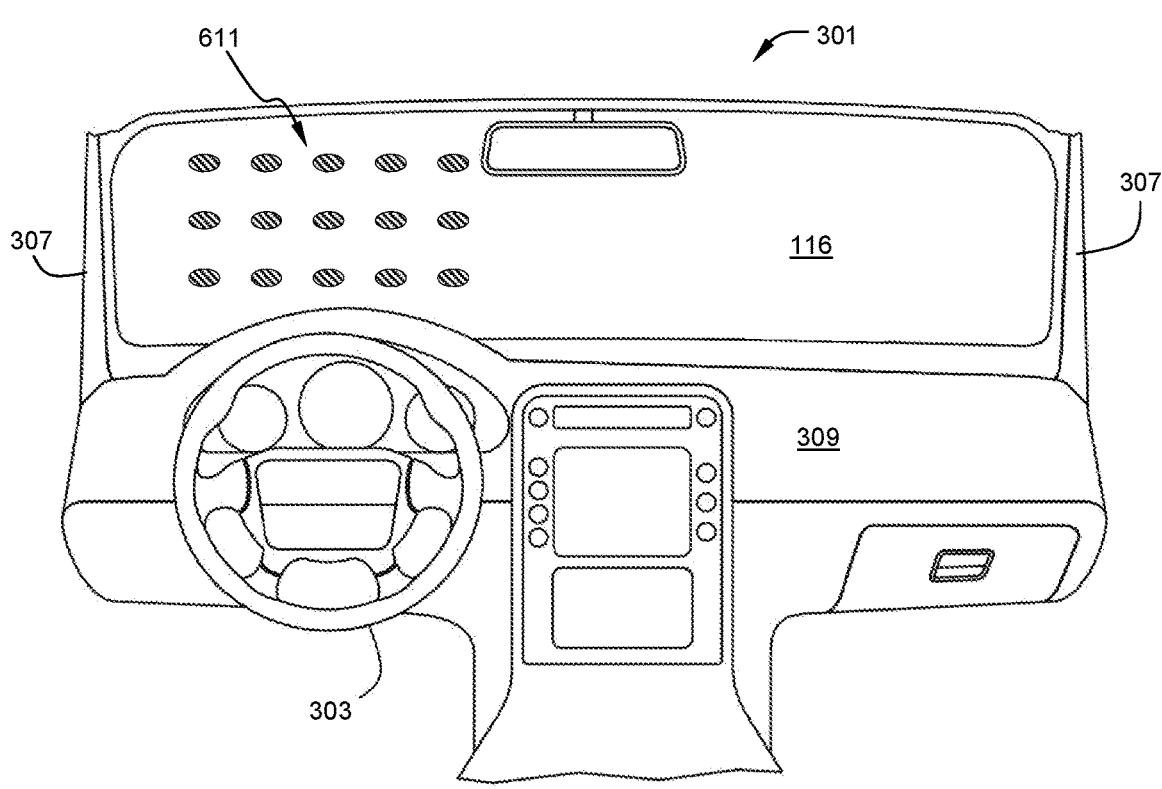
FIG. 6 illustrates a forward looking view of a vehicle interior in accordance with the present disclosure.

With additional reference now to FIG. 6, windshield 116 is shown without any film covering the HUD patch. In this embodiment, exemplary calibration array 445 including an ordered matrix of reflectors distributed over a majority of the forward facing 2-dimensional space of the eyebox 431 is illuminated by the illumination light beam 126 reflected off of windshield 116. The image sensor 151 observes the reflector array image 611 reflected off of the windshield 116 within the HUD patch. With this information, the calibration array 445 may be utilized to determine the center of the user viewing axis corresponding to the calibration location. Moreover, the presence of the reflected image of the ordered matrix of reflectors covering the larger area of the HUD patch allows for distortion correction in the same manner as previously described with respect to the grid of the film embodiments.

In alternate embodiments, it is envisioned that the IR projector may be eliminated and identification features in an ordered matrix of reflective identification features distributed over a majority of the forward facing 2-dimensional space of the eyebox or may be active radiating identification features such as liquid crystal displays (LCD) or light-emitting diodes (LED). Preferably, such active radiating identification features operate outside of the visible spectrum. More preferably, the active radiating identification features operate in the IR spectrum. Other active radiating identification features may be employed in accordance with other aspects of present disclosure. More expansive arrays of identification features may be used which may extend well beyond the traditional limits of an eyebox, and instead are dimensioned closer to the actual size of the HUD patch. Such calibration array may be located within the reflected field of view of image sensor 151, whereby light emitted from the identification features reaches the image sensor 151 through reflection at the windshield 116.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A HUD apparatus for a vehicle, comprising:
    a HUD patch defined upon a reflective surface of a windshield of the vehicle;
    an IR projector providing an IR light beam illuminating the HUD patch;
    a virtual image generator for projecting a virtual image within the HUD patch;
    an image sensor coaligned with the virtual image generator and having a field of view comprising the HUD patch, the image sensor providing a HUD patch image;
    a film disposed on the reflective surface of the windshield within the HUD patch comprising geometric features discernable from the HUD patch image when illuminated by the IR light beam, the geometric features providing information corresponding to distortion effects of the reflective surface within the HUD patch;
    a controller configured to:
    receive, from the image sensor, the HUD patch image; and
    adjust the projected virtual image based upon the HUD patch image.

2. The apparatus of claim 1, wherein adjusting the projected virtual image based upon the HUD patch image comprises adjusting the projected virtual image to counteract the distortion effects of the reflective surface.

3. The apparatus of claim 2, further comprising:
    a calibration array positioned within a HUD eyebox of the vehicle, whereby the HUD patch image comprises the calibration array reflected off the reflective surface of the windshield, the HUD patch image providing information corresponding to a desired center for the projected virtual image within the HUD patch to the controller; and
    wherein adjusting the projected virtual image based upon the HUD patch image comprises centering the projected virtual image based upon the HUD patch image.

4. The apparatus of claim 1, wherein adjusting the projected virtual image based upon the HUD patch image comprises centering the projected virtual image based upon a desired center.

5. The apparatus of claim 1, wherein the film comprises polarization dependent reflectance.

6. The apparatus of claim 1, wherein the film comprises fluorescence.

7. A HUD apparatus for a vehicle, comprising:
    a HUD patch defined upon a reflective surface of a windshield of the vehicle;
    a virtual image generator for projecting a virtual image within the HUD patch;
    an image sensor coaligned with the virtual image generator and having a field of view comprising the HUD patch;
    a controller configured to:
    receive, from the image sensor, a HUD patch image; and
    adjust the projected virtual image based upon the HUD patch image; and
    a calibration array positioned within a HUD eyebox of the vehicle, whereby the HUD patch image comprises the calibration array reflected off the reflective surface of the windshield, the HUD patch image providing information corresponding to distortion effects of the reflective surface within the HUD patch to the controller;
    wherein adjusting the projected virtual image based upon the HUD patch image comprises adjusting the projected virtual image to counteract the distortion effects of the reflective surface.

8. The apparatus of claim 7, wherein adjusting the projected virtual image based upon the HUD patch image comprises centering the projected virtual image based upon the calibration array.

9. The apparatus of claim 7, wherein the calibration array comprises reflective identification features.

10. The apparatus of claim 7, wherein the calibration array comprises active radiating identification features.

11. A HUD apparatus for a vehicle, comprising:
    a HUD patch defined upon a reflective surface of a windshield of the vehicle;
    a virtual image generator for projecting a virtual image within the HUD patch;

an image sensor coaligned with the virtual image generator and having a field of view comprising the HUD patch;
a controller configured to:
receive, from the image sensor, a HUD patch image; and
adjust the projected virtual image based upon the HUD patch image; and
a film disposed on the reflective surface of the windshield within the HUD patch comprising one or more identification features discernable from the HUD patch image, the one or more identification features providing information corresponding to distortion effects of the reflective surface within the HUD patch to the controller;
wherein adjusting the projected virtual image based upon the HUD patch image comprises adjusting the projected virtual image to counteract the distortion effects of the reflective surface.

12. The apparatus of claim 11, further comprising an IR light beam illuminating the film, wherein the film comprises polarization dependent reflectance.

13. The apparatus of claim 11, further comprising an IR light beam illuminating the film, wherein the film comprises fluorescence.

14. A HUD apparatus for a vehicle, comprising:
a HUD patch defined upon a reflective surface of a windshield of the vehicle;
a virtual image generator for projecting a virtual image within the HUD patch;
an image sensor coaligned with the virtual image generator and having a field of view comprising the HUD patch;
a controller configured to:
receive, from the image sensor, a HUD patch image; and
adjust the projected virtual image based upon the HUD patch image;
a film disposed on the reflective surface of the windshield within the HUD patch comprising one or more identification features discernable from the HUD patch image, the one or more identification features providing information corresponding to distortion effects of the reflective surface within the HUD patch to the controller; and
a calibration array positioned within a HUD eyebox of the vehicle, whereby the HUD patch image comprises the calibration array reflected off the reflective surface of the windshield;
wherein adjusting the projected virtual image based upon the HUD patch image comprises adjusting the projected virtual image to counteract the distortion effects of the reflective surface; and
wherein adjusting the projected virtual image based upon the HUD patch image comprises centering the projected virtual image based upon the calibration array.

15. The apparatus of claim 14, further comprising an IR light beam directly illuminating the film and illuminating the calibration array by reflectance off the reflective surface of the windshield, wherein the film comprises polarization dependent reflectance and the calibration array comprises reflectors.

16. A HUD apparatus for a vehicle, comprising:
a HUD patch defined upon a reflective surface of a windshield of the vehicle;
a virtual image generator for projecting a virtual image within the HUD patch;
an image sensor coaligned with the virtual image generator and having a field of view comprising the HUD patch;
a controller configured to:
receive, from the image sensor, a HUD patch image; and
adjust the projected virtual image based upon the HUD patch image; and
a film disposed on the reflective surface of the windshield within the HUD patch comprising one or more identification features discernable from the HUD patch image, the one or more identification features providing information corresponding to a desired center for the projected virtual image within the HUD patch to the controller;
wherein adjusting the projected virtual image based upon the HUD patch image comprises centering the projected virtual image based upon the desired center.

17. A method for operating a HUD apparatus for a vehicle, comprising:
providing a reflective surface on a windshield of the vehicle within a HUD patch;
providing a virtual image generator for projecting a virtual image within the HUD patch;
coaligning an image sensor with the virtual image generator;
receiving, from the image sensor, a HUD patch image;
adjusting the projected virtual image based upon the HUD patch image; and
providing a film disposed on the reflective surface of the windshield, the film comprising one or more identification features discernable from the HUD patch image, the one or more identification features providing information corresponding to distortion effects of the reflective surface within the HUD patch;
wherein adjusting the projected virtual image based upon the HUD patch image comprises adjusting the projected virtual image to counteract the distortion effects of the reflective surface.

18. A method for operating a HUD apparatus for a vehicle, comprising:
providing a reflective surface on a windshield of the vehicle within a HUD patch;
providing a virtual image generator for projecting a virtual image within the HUD patch;
coaligning an image sensor with the virtual image generator;
receiving, from the image sensor, a HUD patch image;
adjusting the projected virtual image based upon the HUD patch image; and
providing a calibration array positioned within a HUD eyebox of the vehicle, the HUD patch image comprising the calibration array reflected off the reflective surface of the windshield, the HUD patch image providing information corresponding to distortion effects of the reflective surface within the HUD patch;
wherein adjusting the projected virtual image based upon the HUD patch image comprises adjusting the projected virtual image to counteract the distortion effects of the reflective surface.

* * * * *